No. 643,649. Patented Feb. 20, 1900.
J. J. HEILMANN.
APPARATUS FOR CONTROLLING ELECTRIC MOTORS.
(Application filed Nov. 8, 1899.)
(No Model.) 2 Sheets—Sheet 1.
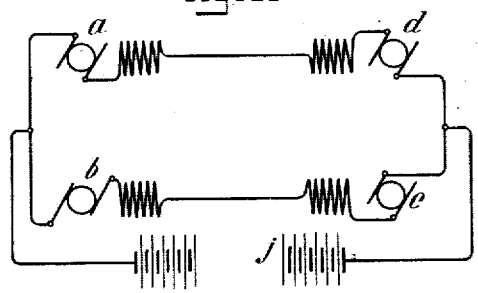
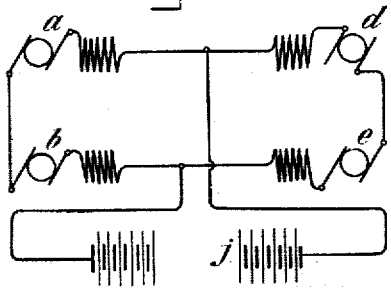
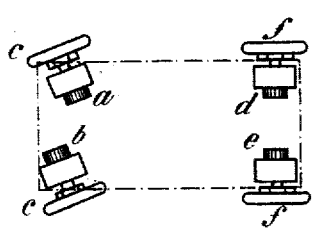
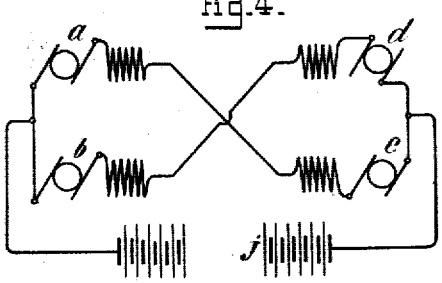
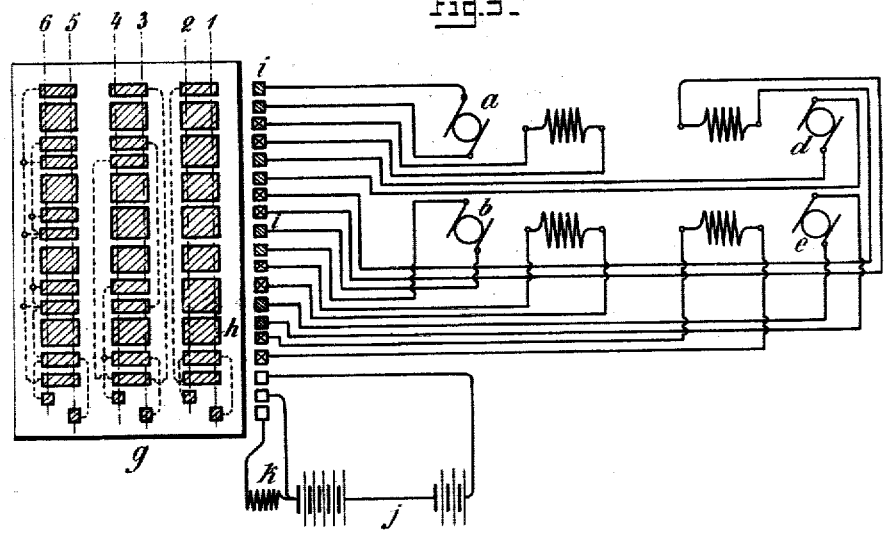

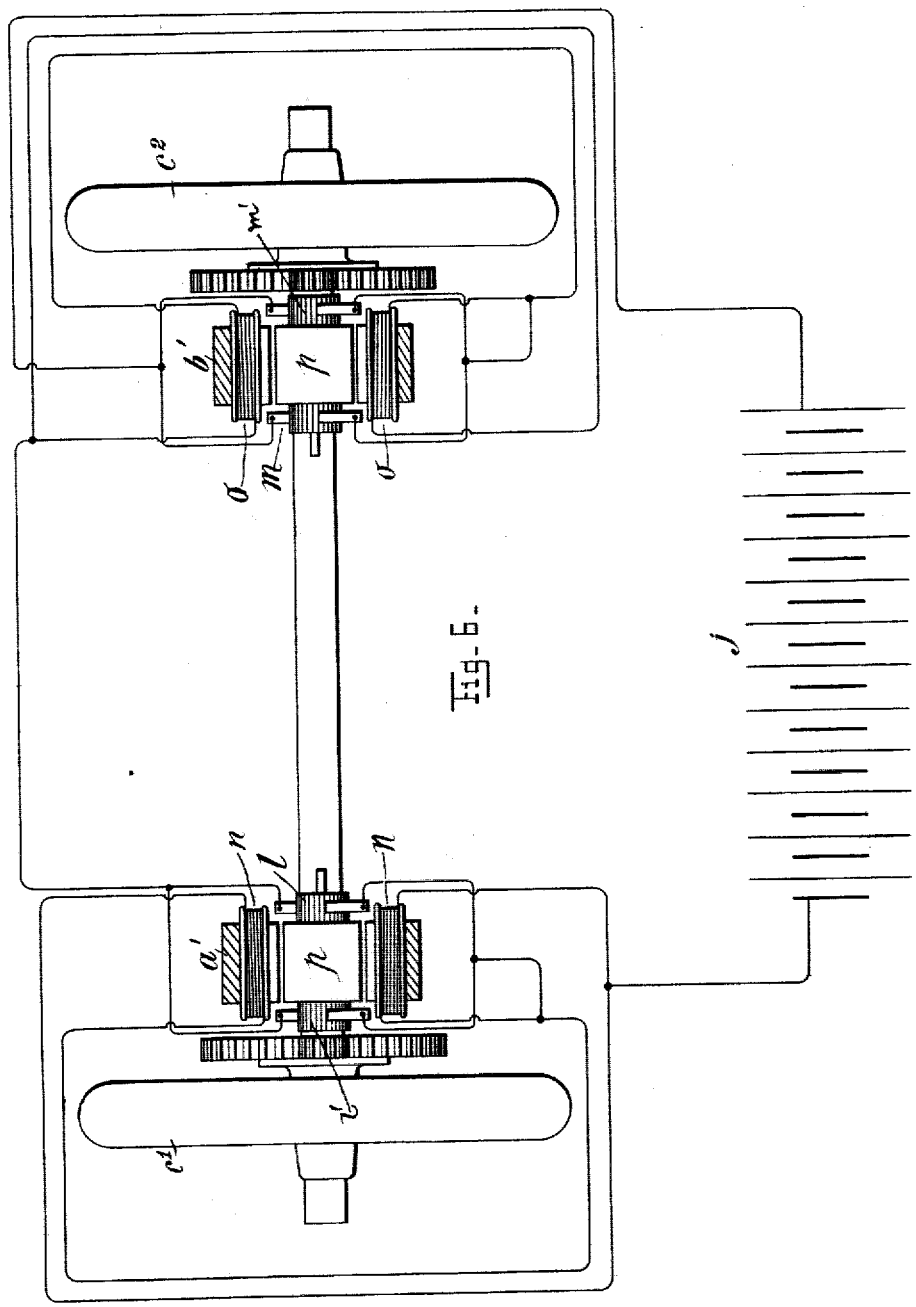

UNITED STATES PATENT OFFICE.

JEAN JACQUES HEILMANN, OF PARIS, FRANCE.

APPARATUS FOR CONTROLLING ELECTRIC MOTORS.

SPECIFICATION forming part of Letters Patent No. 643,649, dated February 20, 1900.

Application filed November 8, 1899. Serial No. 736,233. (No model.)

*To all whom it may concern:*

Be it known that I, JEAN JACQUES HEILMANN, a citizen of the Republic of France, residing at Paris, in the Department of the Seine, France, have invented certain new and useful Improvements in Apparatus for the Control of Electric Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a special arrangement of apparatus for the control of the motors of electric-motor cars *en route* when four motors are used for driving the wheels.

This apparatus has for its object the grouping of the four motors in series or parallel with or without resistances in the particular manner hereinafter described.

Figures 1, 2, 3, 4, and 5 on the accompanying drawings show the principle involved and the mode of its application. Fig. 6 shows a modification.

Supposing that $a$ and $b$, Figs. 1 and 2, are the two motors which drive the two front wheels or the steering-wheels $c$ of a vehicle and that $d$ and $e$ are the motors which drive the back wheels $f$. When the vehicle goes around a curve, Fig. 2, the motors $b$ and $e$ turning at a less speed tend to produce disturbing forces of considerable moment, and if the potential at their terminals is the same as that at the terminals of $a$ and $d$ it follows that they tend to set up a strong couple and that this inequality is detrimental to the regulating of turning, producing strains on the steering-handle and skidding of the wheels. This effect is not produced if the four motors are grouped in series; but it can still be produced when they are grouped in two series of two if this grouping is effected in any way whatever. Supposing, in effect, that it is arranged as shown in Fig. 1—that is to say, that the two motors on the same side of the vehicle will be in series—the motors $b$ and $e$ will tend to produce a stronger couple, and the inconvenience I have indicated will obtain. If, on the contrary, the motor $a$ is put in series with $b$ or $e$ and $d$ in series with $e$ or $b$, the inconvenience in question will disappear or will be greatly diminished. Such is the disposition that is desired to be patented and which Figs. 3 and 4 represent in two different ways diagrammatically. Fig. 5 represents an apparatus having this arrangement. The drum $g$, which carries the movable contacts $h$, is shown as developed in plan. The fixed contacts are marked $i$, and $j$ is the source of electricity, (accumulators, for example.) $a\ b\ d\ e$ are the four motors hereinbefore described. For the sake of simplicity the brake and reversing-gear are not shown. The position 1—that is to say, the position when the movable contacts situated on the generating-line 1 come into contact with the fixed contact-pieces $i$—corresponds to the grouping of the four motors in series with the additional resistances $k$. The position 2 corresponds to the same grouping, but with the resistance out of circuit. The position 3 corresponds to the grouping of the motors in series of two, with additional resistance. The position 4 has the same grouping of the motors, but without resistance. These positions 3 and 4 are those which form the object of my invention.

I can apply the mode of control hereinbefore described not only in the case where the four motors are entirely distinct, as I have described, but also in that where there are only two motors—that is to say, two motor-wheels only—and where each of the motors is provided with two windings. Fig. 6 represents such an arrangement of axle with two motor-wheels $c'\ c^2$, the wheel $c'$ being driven by the motor $a'$ and the wheel $c^2$ by the motor $b'$. (These motors are supposed to be series wound.) The armature $p$ of the motor $a'$ carries two distinct windings, one of these windings being connected to the collector $l$ and the other to the collector $l'$. In a similar way the armature $p'$ of the motor $b'$ is provided with two windings, which are connected, respectively, to the collectors $m\ m'$. The magnet-winding of each motor is equally divided into two sections $n\ n$ for the motor $a'$ and $o\ o$ for the motor $b'$. My system of working as applied to this case is represented diagrammatically in Fig. 6—that is to say, that in the grouping where the collectors are two by two in parallel and the magnet-windings two by two in parallel they are the two windings of the same motor which are in parallel, the two motors $a'$ $b'$ are found to be connected in series. Then as in each of those the two collectors are in parallel and the two magnet-coils in parallel. It will be seen that this arrangement amounts practically to placing two motors on each side of the vehicle, each pair being connected in multiple series with the pair on the opposite side. It follows, therefore, that I can equivalently apply the same system where each of the motors $a'$ and $b'$ has two distinct armatures or two distinct magnets in the place of having two windings on the same armature and on the same magnet, as is represented in the figure.

Having now described my invention, what I claim, and desire to secure by Letters Patent, is—

1. In electric-motor cars four motors, arranged in series diagonally two by two, so that one of the motors on the one side of the carriage is in series with one of the motors on the other side, and adapted to equalize the strains and pressure of the current in the two series of motors when the vehicle is turning a curve, substantially as described.

2. The combination with a four-wheeled electric-motor vehicle, of four motors, one for each wheel, each motor being in series with one on the opposite side of the vehicle, but not in series with the other motor on the same side thereof, substantially as and for the purpose set forth.

3. An electric-motor vehicle having two motors on each side, those on one side being in multiple series with those on the other side, substantially as and for the purpose set forth.

In testimony whereof I affix my signature in presence of two witnesses.

JEAN JACQUES HEILMANN.

Witnesses:
 EDWARD P. MACLEAN,
 HENRY DANZER.